United States Patent Office

2,866,771
Patented Dec. 30, 1958

2,866,771

METHOD OF PREPARING ADHESIVE COMPOSITION COMPRISING A MALEIC ANHYDRIDE COPOLYMER AND PRODUCT OBTAINED

John C. Sellers, Nixon, N. J., assignor to Johnson & Johnson, a corporation of New Jersey No Drawing. Application September 16, 1953
Serial No. 380,594

18 Claims. (Cl. 260—45.5)

This invention relates to adhesives and, in preferred embodiments, to compositions which may be used as pressure-sensitive adhesives.

In manufacture of known adhesives it has been necessary to compound several ingredients in order to arrive at an acceptable formulation. In manufacture of tape, notably transparent pressure-sensitive tapes, or tapes used for surgical purposes, it has been the usual practice to compound together, for example on a heated mill equal parts of an elastomer, a tackifier and a pigment or filler. It has further been found necessary to add a substantial amount of plasticizer in order to provide the desired plastic properties and to permit the adhesive to be readily applied to the adhesive-supporting surface, i. e. backing.

An additional ingredient, nearly always found necessary, is a stabilizer, e. g. an antioxidant, which tends to impart resistance to aging conditions such as air, heat and sunlight. The compounding of these various ingredients itself has constituted a significant problem since it has been necessary to mix them on a pair of rolls which is a time-consuming and expensive operation. With so many ingredients, variations in supply and quality of raw materials has been found to give rise to serious difficulty. The elastomer and the tackifier are particularly susceptible to these circumstances. Even after obtaining the compounded adhesive, one's difficulties were not always finally resolved. It has frequently been impractical to obtain the degree of tack and tensile strength in the end product adhesive since these variables are difficult to control and frequently could not be controlled to the extent nor within the range desired. Migration of the plasticizer from the adhesive composition into surrounding areas or to adjacent films or layers has also been the cause of considerable difficulty.

Objects and advantages of the present invention are solution of problems which arise by reason of the above-listed disadvantages in prior art adhesives. One object is to produce an adhesive having high stick properties which does not require the presence of a tackifier and in particular, an adhesive which may be compounded to stick to an unprimed cellulosic film such as ethyl cellulose or cellulose acetate. A further advantage of the invention is that compounds have been discovered which may be so constituted that they will have plasticity and other properties variable over a wide range, but reproducible and controllable by the method of preparation. Another object of the invention is to provide compounds which have high tensile strength and approach water-whiteness so that they may be used in pressure-sensitive commercial transparent tapes.

Still another object of the invention is to provide, according to one form of the invention, an adhesive compound which may be used, preferably without plasticizer, and will be stable, that is, resistant to aging conditions such as heat, sunlight and air without the need for a stabilizer.

The adhesive compounds of the present invention are certain esters of maleic anhydride-styrene copolymers. Compounds possessing peculiarly valuable adhesive properties according to the invention are such copolymers esterified to the extent of at least 70% of the total potential carboxyl content with a primary aliphatic alcohol having 6 to 16 carbon atoms, inclusive. A further preferred aspect of the invention is provision of adhesives which have a low degree of cold flow as more fully explained hereinafter. The invention is also directed to the method of preparing these compounds and their use in certain articles such as tapes, surgical dressings, and other articles having a supporting surface with a layer of the invention adhesive coated thereon, such as laminated products, e. g. papers, paper board, plywood, etc.

An important advantage of the invention is the provision of adhesives which may be mixed with reinforcing agents to limit cold flow. In marked contrast to prior art adhesives, which generally will stick to themselves tenaciously but to other objects with relatively little force, the invention adhesive is characterized by tenacious adhesion to other objects such as the human skin, but relatively little adhesion to itself. Hence, adhesive tape made from invention adhesive will not stick to itself to the degree that separation is prevented without disruption of the mass or undue deformation of the tape backing.

The styrene-maleic anhydride polymers of the invention are prepared by catalytic copolymerization of the monomers in a solvent, preferably a nonaqueous solvent such as xylene or benzene, and in an inert atmosphere, such as nitrogen. Approximately equimolecular amounts of the monomers are first dissolved in the solvent. A slight excess of styrene may be employed. The solution is then heated to reaction temperature which is in the range above about 40° C. to the boiling point of the solution, and maintained at this level until the reaction has progressed to completion. At higher temperatures, of course, the reaction proceeds at a faster rate. It has been found that the reaction rate may be best controlled at temperatures in the range 40 to 85° C., and hence this temperature range is preferred. If desired, the reaction rate may be effectively controlled at higher temperature levels by adding the styrene and catalyst stepwise.

The molecular weight of the maleic anhydride-styrene polymer is controlled by controlling primarily three variables, i. e. the temperature, the catalyst concentration and the solvent utilized for carrying out the polymerization. Higher temperatures tend to produce low molecular weight polymers and, conversely, low temperatures tend to produce higher molecular weight copolymers. A peroxide catalyst, such as benzoyl peroxide, which is soluble in the solvent medium is added to catalyze the reaction, which is a chain type. There is a tendency on the part of the solvent to interfere to a degree with the polymerization, that is, to combine with the free radical which promotes reaction, and thereby terminate reaction at the point at which the polymerization has progressed on a particular chain. This interference on the part of the solvent has been designated by an index known as the "transfer constant," a term proposed and defined by Mayo, Journal of the American Chemical Society, vol. 65 (1943), pages 2324 to 2329. Solvents having a low transfer constant exhibit relatively slight tendency to interfere with chain-reaction type polymerization, and hence the catalyst concentration becomes important. Benzene is an example of this type solvent. Larger amounts of catalyst produce lower molecular weight polymers. On the other hand, solvents having a relatively high constant tend to have high degree of interference with the polymerization, and catalyst concentration is less important. Xylene is an example of the latter type solvent. The low constant solvents tend to produce higher molecular weight polymers, and the higher constant solvents tend to produce lower molecular weight polymers. However, the use of higher constant solvents such as xylene is not precluded where high molecular weight polymers are desired since the tendency of the xylene to lower the molecular weight may be counteracted to some extent by operating at lower reaction temperature.

As an example of copolymerization of maleic anhydride and styrene, 1.2 mols of styrene and 1.0 mol of maleic anhydride may be placed in a reaction vessel equipped with a mechanical stirrer together with 1200 cc. of xylene as solvent. The reaction vessel is provided with a superjacent vented reflux condenser. Gaseous nitrogen is continuously passed through the vessel. Heat is applied to the vessel while stirring its contents until a temperature of 70° C. is attained. At this point 0.85 gm. of benzoyl peroxide catalyst are added and the 70° C. temperature and stirring continued until reaction is complete. The polymer precipitates as it is formed. The mixture of polymer and solvent produced may be used for preparation of polymer ester as such by adding appropriate amounts of alcohol, antioxidant and esterification catalyst as indicated below, or the polymer and solvent may be separated by filtration prior to esterifying the polymer. Since the styrene is used in molar excess no appreciable amounts of unreacted maleic anhydride will remain after polymerization. Any possible small amounts of polystyrene will be removed from the system during purification following esterification.

Attempts to polymerize maleic ester with styrene have suffered from the tendency of the ester and styrene to polymerize in ratios other than that sought-for according to the present invention. Further, it is difficult to obtain the high molecular weights and plasticities which are important properties of the invention products. Hence, the invention products are preferably made by using the maleic anhydride as monomer, rather than an ester thereof.

The index of polymer molecular weight is the intrinsic viscosity of the polymer. This is measured by preparing a dilute solution of the polymer in cyclohexanone as solvent, and carrying out intrinsic viscosity measurement at 30° C. according to known procedure. For example, a cyclohexanone solution of the polymer having 1 gram of polymer per 100 cc. of solution is prepared, and several dilutions of this solution, e. g. to 0.7 gram per 100 cc. and 0.5 gram per 100 cc. are made. Flow times are then measured at 30° C. on a general purpose Ostwald viscosimeter pipette having a capillary about 0.5 mm. in diameter and a length of about 15 cm. The relative viscosity at each concentration is calculated. Relative viscosity is the ratio of the flow time of the resin solution to the flow time of the solvent. Specific viscosity is defined as the relative viscosity minus one. Reduced specific viscosity is defined as the specific viscosity divided by the concentration in grams per 100 ml. of solution. A plot is made of reduced specific viscosity vs. concentration and the straight line so obtained is extrapolated to zero concentration. The value of the reduced specific viscosity at zero concentration is known as the intrinsic viscosity.

The polymer molecular weight as measured by intrinsic viscosity exerts a notable and important effect upon the properties of the final ester adhesive, as will appear more clearly below. High molecular weight polymers tend to produce adhesives having higher plasticity, and low molecular weight polymers tend to produce adhesives having low plasticity. Suitable polymers are those having viscosities within the approximate range 0.2–2.0, while preferred polymers have viscosities within the approximate range 0.4–1.0. The factor of plasticity and its effect upon properties of the adhesive is gone into more fully below whereupon the importance of controlling the polymer viscosity will be appreciated.

Both the styrene and the maleic anhydride tend to polymerize with the other monomer rather than with itself, and hence the ratio of monomers in the copolymeris about one to one. There is, however, a relatively slight but notable tendency of the styrene to polymerize with itself. Hence, the molar ratio of the styrene to maleic anhydride is slightly greater than one, i. e. about 1.2 mols of styrene to 1.0 of maleic anhydride.

The particular alcohol used to esterify the polymer ester has an important effect upon the properties, such as plasticity, of the final adhesive produced. Ten carbon atom alcohols produce adhesives having lowest plasticity, i. e. the softest adhesives. As alcohol molecular weight is decreased below n-decyl alcohol the tendency is to produce adhesives which are harder, i. e. have a higher plasticity. As alcohol molecular weight is increased above 10, the polymer esters again increase in plasticity. The choice of alcohol is a convenient variable which may be employed in producing an adhesive having the particular sought-for properties in any case. Generally, satisfactroy adhesives may be prepared from primary monohydric aliphatic alcohols in any case. Generally, satisfactory adhesives may be either straight or branch chain alcohols. The straight chain alcohols are, however, preferred since they tend to produce softer and tackier adhesives, thereby giving more latitude in manufacture of an adhesive having specific sought-for properties. The lower carbon atom and the high carbon atom alcohols within the broad range may find particular utility as laminating adhesives since they tend to be harder. However, as indicated above, it is an important advantage of the invention to manufacture pressure-sensitive adhesives which do not require use of plasticizers or tackifiers. Alcohols having 8 to 14 carbon atoms, inclusive, are therefore preferred for manufacture of pressure-sensitive adhesives since the degree of softness and plasticity of adhesives obtained by use of alcohols within this range is such that tackifiers and plasticizers may be dispensed with. Normal decyl alcohol and lauryl alcohol are preferred materials for manufacture of adhesives according to the invention. Another very suitable alcohol is a mixture of branch chain decyl alcohols known as "CPS 224," a product of "Enjay" Standard Oil Company of New Jersey. Other satisfactory alcohols for manufacture of pressure-sensitive adhesives are n-octyl, n-nonyl, branch chain decyl, and n-undecyl alcohols.

The percentage of esterification of the copolymers is another factor having an important effect upon the adhesives. "Percent esterification" is defined as the overall percentage of total potential carboxyl groups on the polymer chains that are in the form of the ester group —COOR, where R is the alkyl part of the alcohol. "Potential carboxyl groups" include carboxyl groups as such and groups capable of yielding the carboxyl group by hydrolysis and having the formula

where X is hydrogen, alkyl, metal or carbon (e. g. as in the case of the anhydride) are, therefore, included. The higher the percentage of esterification, the greater the tack possessed by the adhesives and the softer the adhesive becomes. Below 70% esterification, the esters possess insufficient tack for invention purposes. The important sought-for properties of the invention adhesives begin to become apparent at percent of esterification above 70%. Hence, the invention contemplates adhesives esterified in the range of 70 to 100%. Adhesives in the lower portion of this range possess inherent tacky properties but may be harder so as to require the addition of certain amounts of plasticizers. However, at percent esterification above about 80–85%, sufficient alcohol will have been incorporated into the adhesive to impart softness so that addition of extraneous plasticizer is not necessary, and the adhesives will be found to be self-plasticized.

As previously indicated, higher percentage esterification tends to produce adhesives which are softer. However, even at esterifications approaching 100% the plasticity of the adhesive can be controlled by choice of molecular weight of alcohol and degree of polymerization of maleic anhydride-styrene copolymer. Further, the higher the esterification of the copolymer, the less is its tendency to cross-link during heating, aging, etc., and hence the greater is its stability. Adhesives approaching esterification of 100%, i. e., above 95%, have the outstanding advantage of optimum degree of tack. Their softness and tendency to cold flow can be controlled by methods explained below.

Reaction conditions for esterification of the polymer are important in obtaining the high percentages of esterification required according to the present invention.

The esterification reaction of the copolymer is preferably, though not necessarily, carried out in the same solvent that was used for polymerization. However, the polymer raw material may be purchased, and dissolved in solvent rather than synthesized. A molar excess of the desired alcohol is added to the solution together with an antioxidant and catalyst. Suitable antioxidants include 2,5-ditertiarybutylhydroquinone, 2,6-ditertiarybutyl-p-cresol, and others known in the art, while as catalysts, p-toluene sulfonic acid, benzene sulfonic acid, sulfuric acid, and many others are satisfactory. The solution is then boiled and water of esterification removed until reaction is substantially complete. The completeness of the reaction is observed by the rate of removal of water and when this rate becomes insignificant the reaction is considered as being substantially complete. Hydrocarbons, preferably aromatic hydrocarbons boiling above 100° C. are suitable solvents. Using diethyl benzene as a solvent (boiling point 182° C.) completion of the reaction may occur in about 70 minutes. With xylene (B. P. 139–144° C.) the reaction may take 6 to 8 hours, while with toluene (B. P. 110.6° C.) 12 or more hours may be required for substantially complete esterification. The concentration of esterification catalyst has considerable effect upon the rate of reaction. After the esterification reaction has progressed to the desired degree the reaction is terminated by cooling the reaction mass.

Various procedures may be used for recovering the adhesive from the solution. For example, the reaction mass after esterification may be placed in a vessel fitted with a mechanical agitator and an outlet at the bottom. Methanol may then be added, with stirring, until the ester just precipitates sufficiently to form two distinct layers upon being allowed to settle. The ester is drawn off from the bottom of the flask. The methanol layer, containing impurities, may be treated to recover solvents, as by distillation. The ester is put back into the vessel and just enough toluene or benzene added to redissolve it. Again, methanol is added until the ester just precipitates. It is allowed to settle, and again separated from the methanol layer. This procedure is repeated twice more. At this point the ester will have acquired a very light yellow color. Generally a total amount of methanol equal to only one-half the volume of original ester solution is required for purification.

An alternative procedure for recovering adhesive which is 90–95% or more esterified is to pour the reaction mass after cooling into a sufficient amount of acetone to cause precipitation of the polymer. The liquid is decanted and the polymer is washed with small amounts of acetone. The polymer at this stage will be almost water-white.

The polymer ester solution after purification may be treated with a small amount, i. e. 2%, of an antioxidant stabilizer such as 2,5-ditertiarybutylhydroquinone to stabilize the less completely esterified polymers during drying, since less completely esterified copolymers may tend to cross-link when heated without antioxidant. The solution is then evaporated on a steam bath and the semi-dried polymer ester is dried in a vacuum chamber at 100° C. and 15 inches of mercury absolute pressure.

Polymer ester plasticity is a key property determining its suitability for use in various types of adhesives. The plasticity should be high enough to afford adequately high tensile strength and low enough so that it can be successfully worked and calendered or spread onto the sheet. Plasticity is measured on a cylindrical pellet of adhesive mass 16 mm. in diameter and weighing 2.00 grams by placing the pellet on a parallel plate plastometer, otherwise known as a Williams plastometer, of the type manufactured, for example, by the Scott Instrument Company, and maintaining the pellet and surroundings at 100° F. and under a 5000 gram load, and noting the height of the pellet after 14 minutes. This height in millimeters is taken as a measurement of plasticity. For invention purposes, polymer esters having plasticity so low as to be outside the range of accurate measurement on the instrument may be satisfactory. Methods are available to increase plasticity, as will be explained below. The desired plasticity is obtained, as implied above, by controlling viscosity of the copolymer (high viscosities tend to produce high plasticities), controlling the alcohol used for esterification (alcohols having 8 to 12 carbon atoms tend to produce adhesives having low plasticities), and controlling the degree of esterification (high esterification tends to produce low plasticity). On the other hand, adhesives which have higher plasticities, that is, above the range of those which may be used unplasticized as pressure-sensitive adhesives, may be used as laminating adhesives unplasticized or may be made usable as pressure-sensitive adhesives by incorporating suitable amounts of plasticizer. However, adhesives in the plasticity range substantially above 4.0 mm. are substantially less advantageous when plasticized for use as pressure-sensitive adhesives since they may lack the necessary cohesive strength. It is generally endeavored to produce adhesives having plasticities not substantially above 4.0 mm. The preferred range of plasticity is in the approximate region 0.7–3.0 mm., since within this range polymer esters have plasticity such that no plasticizer is necessary to produce adhesive masses having a high degree of tack and pressure-sensitivity.

As indicated above, there is a tendency on the part of certain of the invention adhesives to exhibit some cold flow, that is, lack of body, and susceptibility to plastic flow over long periods of time when under stress. This phenomenon may be overcome by incorporating a reinforcing agent. Suitable reinforcing agents are finely divided materials used in compounding rubbers, such as carbon black, silica gel, calcium carbonate or calcium salicylate. To reduce cold flow, they are added to the invention materials to the extent of at least ½%, preferably about 2% by weight.

An alternative manner of effecting reinforcing of the polymer ester is to add at least 5% of a compatible elastomer such as highly polymerized polyvinyl ethyl ether, butadiene-styrene copolymer, polyisobutylene, or polyethylacrylate. Greater amounts of elastomer may be utilized within the limits of compatibility with the polymer ester.

The reinforcing agent may be dispersed in the adhesives in a ball mill or paint mill, or can be mixed on the rolls. The amount of reinforcing agent required in order to reduce cold flow to the sought-for levels specified below will be determined to a large extent by the plasticity of the ester, low plasticity polymer esters requiring generally more reinforcing agent than high plasticity esters. From the standpoint of sufficient agent to reduce cold flow to acceptable levels, even for the higher plasticity esters, minimum amounts of reinforcing material are specified above.

The property of cold flow may be measured by sticking a ball of the adhesive weighing 3.0 grams against a vertical glass plate and noting the downward flow in inches due to gravity for a period of 24 hours at room temperature. Particularly suitable pressure-sensitive adhesives of the invention are those which are reinforced to the extent that cold flow is not greater than 2½ inches as measured by this standard method.

Although styrene has been used above to exemplify the type of monomer which may be utilized to make the polymer and thence the polymer ester according to the invention, by replacing the styrene with another compound having a benzene ring substituted with a vinyl side-chain, i. e. a ring-substituted styrene, such as methyl styrene (vinyl toluene), adhesives having similar pressure-sensitive properties may be produced. Hence, the invention products include esters of maleic acid-ring substituted styrene copolymer having the foregoing properties.

The advantages of the invention composition are especially outstanding in respect to adhesiveness, particularly pressure sensitivity. However, the novel compositions of the invention possess other advantageous properties which render them suitable for other applications. Among the outstanding advantages of the invention products is their ability to stick to unprimed film, e. g. cellulosic films such as ethyl cellulose, cellulose acetate, or (when cross-linked) to regenerated cellulose. The adhesive compounds further have the property of sticking to unprimed films of polyvinyl chloride resin, and polyethylene glycol terephthalic acid film which is marketed by E. I. du Pont de Nemours & Company under the trademark "Mylar."

The following examples are presented as illustrating rather than limiting the scope of the invention. Parts and percentages are on a weight basis unless otherwise specified.

Example I 1.28 mols (123 gms.) of maleic anhydride and 2000 cc. of benzene were placed in a five liter flask fitted with a reflux condenser, thermometer and stirrer. The mixture was brought to 80° C. while stirring and while passing gaseous nitrogen through the flask. 1.5 mols (156 gms.) of monomeric styrene in which had been dissolved 1% (2.8 gms.) of benzoyl peroxide were added to the maleic anhydride solution dropwise at such a rate so as to maintain temperature of the reaction at 80° C. Polymerization commenced after about 7 minutes as evidenced by the precipitation of copolymer from the solution. Polymerization conditions were maintained for 3 hours after all styrene had been added. The copolymer was in the form of a thick suspension. The reaction mixture was filtered, washed with benzene, and dried. Intrinsic viscosity of the copolymer was 0.91 as measured in cyclohexanone at 30° C. The copolymer, which weighed 240 gms., was placed in a five liter flask fitted with an azeotropic trap and stirrer together with 3.1 mols (485 gms.) of n-decanol, 23 gms. based on the weight of copolymer plus alcohol of p-toluene sulfonic acid, 38 gms. of 2,5-ditertiarybutylhydroquinone, and 1000 cc. of xylene. The mixture was heated to boiling whereupon the copolymer went into solution. Refluxing was continued for 8 hours, after which the rate at which the water was being collected in the trap was very slow. 22 cc. of water had been collected. The reaction mass was cooled and placed in a vessel having a mechanical stirrer and outlet at the bottom. Just enough methanol was added to cause precipitation. The ester was permitted to settle, and was separated from the methanol which was recoverable by distillation. The ester was replaced in the vessel and just enough benzene added to dissolve it. Again the ester was precipitated by addition of methanol, and the ester was separated. The ester was dissolved and precipitated in this manner two additional times. It was finally separated and placed in an evaporating dish. After evaporating off most of the methanol from the ester it was dried at 100° C. and 15 in. of mercury absolute pressure. The product was extremely tacky and had plasticity of 1.11 mm. Yield was 425 gms. or 85% of theory. Percent esterification was calculated to be about 97% based on the amount of water collected in the azeotropic trap. The adhesive may be spread on a supporting surface, such as a piece of tape, plywood or paper. Adhesive masses for pressure-sensitive tapes may be made by milling the polymer ester with elastomer according to the procedure of Example VII, or a finely divided rubber compounding reinforcing agent such as silica gel or carbon black. These masses are spread on primed vinyl film, cloth, or waterproof cloth. Aging tests indicate the mass to retain most of its initial tack for at least 10 months at 120° F.

Example II 203 parts of maleic anhydride and 2150 parts of xylene were placed in the flask described in Example I. The mixture was brought to 70° C. while stirring and passing nitrogen continuously through the flask. 252 parts of styrene in which had been dissolved 1.75 parts of benzoyl peroxide were added to the maleic anhydride solution dropwise to maintain reaction temperature at 70° C. Polymerization commenced after about 5 minutes as evidenced by precipitation of copolymer. After 3 hours reaction time the mixture was filtered, washed with benzene and dried. Intrinsic viscosity as measured in cyclohexanone at 30° C. was 0.63. The copolymer consisting of 413 parts was placed in a flask fitted with an azeotropic trap as described in Example I together with 800 parts of n-decanol, 31.5 parts of p-toluene sulfonic acid, 52.5 parts of 2,5-ditertiarybutylhydroquinone, and 1200 parts of xylene. Esterification was carried out as described in Example I for 12 hours. After 38.5 parts of water had been collected, the rate of collection had become very small. The reaction mass was cooled, placed in a separatory vessel as described in Example I, and mixed with just enough methanol to cause precipitation. The ester was separated and redissolved in benzene, followed by reprecipitation and separation. The ester was dissolved and reprecipitated in this manner two additional times, after which it was separated and dried as in Example I. The polymer ester was found to be extremely tacky and to have plasticity of 0.90, yield being 880 parts or 84% of theory. Percent esterification was calculated to be in the range 90 to 95%. The polymer ester may be mixed with a finely divided reinforcing agent or an elastomer reinforcing agent as was the product in Example I.

Example III 51 parts styrene-maleic anhydride copolymer having intrinsic viscosity of 0.52 were placed in an esterification apparatus fitted with an azeotropic trap and a mechanical stirrer together with 78 parts of n-octyl alcohol, 5 parts p-toluene sulfonic acid, 6.5 parts 2,5-ditertiarybutylhydroquinone, and 172 parts xylene. The mixture was refluxed for 6 hours, after which 5.1 parts of water had been collected, and the reaction was considered to be substantially complete as evidenced by substantial cessation of liberation of water. The reaction mass was cooled and poured into about twice its volume of acetone whereupon the ester precipitated. The ester was separated, dissolved in toluene, precipitated with acetone, decanted and washed with acetone. The polymer ester was almost water-white at this stage. The wet precipitate was semi-dried on a steam bath, and dried in a vacuum drier at 100° C. and 15 in. mercury absolute pressure. The dried polymer was almost water-white, was extremely tacky and had plasticity of 1.81.

Example IV

In the esterification apparatus described in Example III there were placed 46 parts of styrene-maleic anhydride copolymer, intrinsic viscosity 0.81, 95 parts of a mixture of alcohols containing a high proportion of branch chain decyl alcohols known in the trade as "CPS 224," a product of "Enjay," Standard Oil Company of New Jersey, 4.5 parts p-toluene sulfonic acid, 7.5 parts 2,5-ditertiarybutylhydroquinone, and 172 parts xylene. The mixture was refluxed for 6 hours, after which 5.7 parts had been collected, and reaction completion was evidenced by substantial cessation of water liberation. The reaction mass was cooled and poured into about twice its volume of acetone whereupon the ester precipitated. The ester was reprecipitated from toluene by acetone addition, and washed with acetone. The product was almost water-white at this stage. After drying the polymer was found to be extremely tacky and to have a plasticity of 2.0. Yield was 97 parts which was equivalent to 85% of theory. Percent esterification was 92%.

*Example V*

Example IV was repeated using 101 parts copolymer having intrinsic viscosity 0.67, 123 parts n-hexyl alcohol, 6.8 parts p-toluene sulfonic acid, 11.2 parts 2,5-ditertiarybutylhydroquinone, and 258 parts xylene. Esterification was continued until substantially complete, and the dried polymer recovered as described in the previous examples. The product had plasticity of 3.56. It was not tacky at room temperature but was extremely tacky when plasticized with 25% mineral oil or when heated to 100° C.

*Example VI*

Example IV was repeated except that the reactants were 51 parts styrene-maleic anhydride copolymer, intrinsic viscosity 0.58, 112 parts lauryl alcohol (technical), 5 parts p-toluene sulfonic acid, 8 parts 2,6-ditertiarybutyl-p-cresol, and 172 parts xylene. After substantially complete esterification the reaction mass was cooled and precipitated with acetone. The product was reprecipitated from toluene with acetone, washed with acetone, evaporated and dried. The dried polymer was almost water-white, was extremely tacky and had plasticity of 1.08 mm. Yield was 250 parts or 90% of theory. Percent esterification was calculated to be 92%.

*Example VII*

808 parts of styrene-maleic anhydride copolymer, intrinsic viscosity 0.47, were placed in an esterification apparatus as described in Example IV, together with 1520 parts n-decanol, 120 parts 2,5-ditertiarybutylhydroquinone, and 2750 parts of xylene. The mixture was heated to boiling, refluxed, and water was removed in an azeotropic trap. 10 samples of polymer were removed from the flask at intervals, and the amount of water collected at the time of removal of each sample was noted. Percent esterifications were calculated for each sample, and the polymer esters were recovered and purified according to the procedure described in the foregoing examples. Characteristics of the samples were as follows:

| Reaction Time | Percent Esterification | Plasticity, mm. | Appearance |
| --- | --- | --- | --- |
| 15 min | 61.6 | | Hard, brittle, not tacky, not tacky when plasticized. |
| 1 hour | 74.5 | | Hard, brittle, not tacky, tacky when plasticized. Somewhat flexible. |
| 1 hour, 30 min | 82.7 | high | Hard, brittle, not tacky at room temperature, tacky when plasticized, more flexible. |
| 2 hours | 85.9 | high | Hard, flexible, not tacky at room temperature, tacky when plasticized. |
| 3½ hours | 90.5 | 1.83 | Hard, tacky at room temperature. |
| 4 hours | 91.7 | 1.32 | Tacky. |
| 4½ hours | 92.7 | 1.19 | Do. |
| 5½ hours | 94.2 | 0.98 | Do. |
| 6½ hours | 95.5 | 0.86 | Very tacky. |
| 7½ hours | 96.3 | 0.76 | Do. |

The plasticity of the purified and dried polymer ester was 0.76 mm. and cold flow was 5¼ inches as measured by the vertical glass plate method described above. Separate portions of the ester were mixed on a roll mill with several types of reinforcing agents with the following results. Percentage composition is based on the weight of the mixture. The last column in the table gives the approximate maximum tolerance of the polymer ester for the reinforcing agent.

| Test No. | Type Agent | Amount Agent, percent | Adhesive with Agent | | Maximum Tolerance, percent |
| --- | --- | --- | --- | --- | --- |
| | | | Plasticity, mm. | Cold Flow, in. | |
| 1 | Polyvinyl ethyl ether.[1] | 10 | 0.85 | 2.9 | 30 |
| | | 20 | 1.12 | 1.3 | |
| 2 | Butadienestyrene copolymer.[2] | 10 | 0.81 | 3.3 | 15 |
| 3 | Polyisobutylene.[3] | 10 | 0.81 | 2.8 | 15 |
| 4 | Polyethylacrylate.[4] | 5 | 0.79 | 4.0 | 20 |
| | | 10 | 0.86 | 3.5 | |
| 5 | Silica gel.[5] | 2 | 0.97 | 1.5 | |
| | | 5 | 0.76 | 2.3 | |
| 6 | Carbon black.[5] | 5 | 0.86 | 1.9 | |
| 7 | Calcium salicylate.[5] | 5 | 0.79 | 2.4 | |
| 8 | Calcium carbonate.[5] | 10 | 0.74 | 2.4 | |

[1] Highly polymerized, hard and rubbery.
[2] "GR-S" tire rubber.
[3] "Vistanex B-100" highly polymerized.
[4] "Hycar PA" highly polymerized.
[5] A light finely divided powder, of type suitable for use in compounding rubber.

*Example VIII*

1.17 gm. mols of vinyl toluene (a mixture of isomers) were subjected to copolymerizing conditions with 1.0 mol maleic anhydride and xylene solvent at 80° C. in the presence of 1.2 gms. benzoyl peroxide in the polymerization apparatus described in Example I. Polymerization was substantially complete within one hour. The precipitated copolymer was filtered, washed with benzene and dried. Intrinsic viscosity was 0.8. Yield was 136 gms., equivalent to 63% of theory. 0.5 mol of the copolymer was esterified with 1.2 mols n-decanol in 300 cc. xylene solvent using 7.8 gms. p-toluene sulfonic acid as catalyst and 10.5 gms. of 2,5-ditertiarybutylhydroquinone as antioxidant. After 7 hours of refluxing 19.9 cc. of water had been collected, and the reaction was considered to be substantially complete. The ester was isolated by precipitating with methanol, separating the phases, and reprecipitating from benzene several times. The product was dried at 100° C. Plasticity was 1.30. The tack of the polymer ester was comparable to the styrene-maleic anhydride copolymer decyl esters prepared according to the foregoing examples. Yield was 216 gms. or 84% of theory based on the weight of copolymer. Percent esterification was 90-95%.

Any of the adhesives made according to the foregoing examples may be utilized by applying them to an adhesive-supporting surface, plasticized where necessary, or they may be mixed with reinforcing agent to impart resistance to cold flow, and applied to an adhesive-supporting surface.

Although certain of the foregoing examples specify the use of an antioxidant during esterification, under some conditions an antioxidant is not required. Specifically, when the viscosity of the copolymer is less than one, antioxidant may be dispensed with without incurring undesirable degree of gelling, i. e. cross-linking during esterification. The polymer esters of the invention are notable for their tendency to stick only to skin, while having minimum adhesion to other objects and minimum adhesion to themselves.

It will be apparent that modifications may be made and equivalents substituted within the scope of the invention. Hence, the invention is not limited to the illustrations presented.

The claims are:

1. An adhesive composition adapted to stick to unprimed polyvinylchloride resin film to provide an adhesive layer surface which is characterized by tenacious adhesion to other objects including human skin but relatively little adhesion to itself, whereby upon contact of two portions of the adhesive surface they will not adhere to each other to such an extent that upon their separation from each other there is disruption of the adhesive mass and undue deformation of the film backing, said composition comprising an ester of a copolymer of maleic anhydride and a vinyl compound selected from the group consisting of styrene and vinyl toluene copolymerized in approximately equimolecular proportions, the copolymer having an intrinsic viscosity in the approximate range of 0.2 to 2.0 as measured in cyclohexanone at 30° C., at least 70% of the potential carboxyl groups present in the anhydride groups in said copolymer being esterified with an aliphatic primary monohydric saturated alcohol having 6 to 16 carbon atoms, and a highly polymerized material from the group consisting of polyvinyl ethyl ether, butadiene-styrene, polyisobutylene and polyethylacrylate in an amount equal to at least 5% by weight of the composition, the plasticity of said composition being not greater than about 4.0 mm. and the cold flow of said composition being not greater than 2.5 inches, said plasticity being the height of a cylindrical pellet of the composition weighing 2.0 grams and having an initial diameter of 16 mm. placed on a parallel plate plastometer and maintained at 100° F. under a load of 5000 grams measured at the end of a 14 minute period, and said cold flow being measured by sticking a ball of the adhesive weighing 3.0 grams against a vertical glass plate and measuring the downward flow thereof at room temperature at the end of a 24 hour period.

2. An adhesive composition adapted to stick to unprimed polyvinylchloride resin film to provide an adhesive layer surface which is characterized by tenacious adhesion to other objects including human skin but relatively little adhesion to itself, whereby upon contact of two portions of the adhesive surface they will not adhere to each other to such an extent that upon their separation from each other there is disruption of the adhesive mass and undue deformation of the film backing, said composition comprising an ester of a copolymer of maleic anhydride and a vinyl compound selected from the group consisting of styrene and vinyl toluene copolymerized in approximately equimolecular proportions, the copolymer having an intrinsic viscosity in the approximate range of 0.2 to 2.0 as measured in cyclohexanone at 30° C., at least 70% of the potential carboxyl groups present in the anhydride groups in said copolymer being esterified with an aliphatic primary monohydric saturated alcohol having 6 to 16 carbon atoms, and a highly polymerized polyvinyl ethyl ether in an amount equal to at least 5% by weight of the composition, the plasticity of said composition being not greater than about 4.0 mm. and the cold flow of said composition being not greater than 2.5 inches, said plasticity being the height of a cylindrical pellet of the composition weighing 2.0 grams and having an initial diameter of 16 mm. placed on a parallel plate plastometer and maintained at 100° F. under a load of 5000 grams measured at the end of a 14 minute period, and said cold flow being measured by sticking a ball of the adhesive weighing 3.0 grams against a vertical glass plate and measuring the downward flow thereof at room temperature at the end of a 24 hour period.

3. A composition of claim 2 wherein the vinyl compound is styrene and the alcohol is n-decanol.

4. A composition of claim 2 wherein the vinyl compound is vinyl toluene and the alcohol is n-decanol.

5. A method of preparing the composition of claim 2 which comprises forming a solution of a copolymer of maleic anhydride and a vinyl compound selected from the group consisting of styrene and vinyl toluene copolymerized in approximately equimolecular proportions in a non-aqueous solvent, the copolymer having an intrinsic viscosity in the approximate range of 0.2 to 2.0 as measured in cyclohexanone at 30° C., incorporating in said solution an aliphatic primary monohydric saturated alcohol having 6 to 16 carbon atoms together with an esterification catalyst and an antioxidant, and heating the resulting sodlution to esterification temperature with removal of water of esterification from the system until at least 70% of the potential carboxyl groups present in the anhydride groups in said copolymer are esterified, recovering the resulting ester from the solution, and mixing at least 5% of the highly polymerized polyvinyl ethyl ether therewith, based on the weight of the composition.

6. An adhesive product comprising an adhesive-supporting surface coated with an adhesive composition adapted to stick to unprimed polyvinylchloride resin film to provide an adhesive layer surface which is characterized by tenacious adhesion to other objects including human skin but relatively little adhesion to itself, whereby upon contact of two portions of the adhesive surface they will not adhere to each other to such an extent that upon their separation from each other there is disruption of the adhesive mass and undue deformation of the film backing, said composition comprising an ester of a copolymer of maleic anhydride and a vinyl compound selected from the group consisting of styrene and vinyl toluene copolymerized in approximately equimolecular proportions, the copolymer having an intrinsic viscosity in the approximate range of 0.2 to 2.0 as measured in cyclohexanone at 30° C., at least 70% of the potential carboxyl groups present in the anhydride groups in said copolymer being esterified with an aliphatic primary monohydric saturated alcohol having 6 to 16 carbon atoms, and a highly polymerized polyvinyl ethyl ether in an amount equal to at least 5% by weight of the composition, the plasticity of said composition being not greater than about 4.0 mm. and the cold flow of said composition being not greater than 2.5 inches, said plasticity being the height of a cylindrical pellet of the composition weighing 2.0 grams and having an initial diameter of 16 mm. placed on a parallel plate plastometer and maintained at 100° F. under a load of 5000 grams measured at the end of a 14 minute period, and said cold flow being measured by sticking a ball of the adhesive weighing 3.0 grams against a vertical glass plate and measuring the downward flow thereof at room temperature at the end of a 24 hour period.

7. An adhesive composition adapted to stick to unprimed polyvinylchloride resin film to provide an adhesive layer surface which is characterized by tenacious adhesion to other objects including human skin but relatively little adhesion to itself, whereby upon contact of two portions of the adhesive surface they will not adhere to each other to such an extent that upon their separation from each other there is disruption of the adhesive mass and undue deformation of the film backing, said composition comprising an ester of a copolymer of maleic anhydride and a vinyl compound selected from the group consisting of styrene and vinyl toluene copolymerized in approximately equimolecular proportions, the copolymer having an intrinsic viscosity in the approximate range of 0.2 to 2.0 as measured in cyclohexanone at 30° C., at least 70% of the potential carboxyl groups present in the anhydride groups in said copolymer being esterified with an aliphatic primary monohydric saturated alcohol having 6 to 16 carbon atoms, and a highly polymerized butadiene-styrene copolymer in an amount equal to at least 5% by weight of the composition, the plasticity of said composition being not greater than about 4.0 mm. and the cold flow of said composition being not greater than 2.5 inches, said plasticity being the height of a cylindrical pellet of the composition weighing 2.0 grams and having an initial diameter of 16 mm. placed on a parallel plate plastometer and maintained at 100° F. under a load of 5000 grams measured at the end of a 14 minute period, and said cold flow being measured by sticking a ball of the adhesive weighing 3.0 grams against a vertical glass plate and measuring the downward flow thereof at room temperature at the end of a 24 hour period.

8. A composition of claim 7 wherein the vinyl compound is styrene and the alcohol is n-decanol.

9. A method of preparing a composition of claim 7 which comprises forming a solution of a copolymer of maleic anhydride and a vinyl compound selected from the group consisting of styrene and vinyl toluene copolymerized in approximately equimolecular proportions in a non-aqueous solvent, the copolymer having an intrinsic viscosity in the approximate range of 0.2 to 2.0 as measured in cyclohexanone at 30° C., incorporating in said solution an aliphatic primary monohydric saturated alcohol having 6 to 16 carbon atoms together with an esterification catalyst and an antioxidant, and heating the resulting solution to esterification temperatures with removal of water of esterification from the system until at least 70% of the potential carboxyl groups present in the anhydride groups in said copolymer are esterified, recovering the resulting ester from the solution, and mixing at least 5% of the highly polymerized butadiene-styrene copolymer therewith, based on the weight of the composition.

10. An adhesive product comprising an adhesive supporting surface coated with an adhesive composition adapted to stick to unprimed polyvinylchloride resin film to provide an adhesive layer surface which is characterized by tenacious adhesion to other objects including human skin but relatively little adhesion to itself, whereby upon contact of two portions of the adhesive surface they will not adhere to each other to such an extent that upon their separation from each other there is disruption of the adhesive mass and undue deformation of the film backing, said composition comprising an ester of a copolymer of maleic anhydride and a vinyl compound selected from the group consisting of styrene and vinyl toluene copolymerized in approximately equimolecular proportions, the copolymer having an intrinsic viscosity in the approximate range of 0.2 to 2.0 as measured in cyclohexanone at 30° C., at least 70% of the potential carboxyl groups present in the anhydride groups in said copolymer being esterified with an aliphatic primary monohydric saturated alcohol having 6 to 16 carbon atoms, and a highly polymerized butadiene-styrene copolymer in an amount equal to at least 5% by weight of the composition, the plasticity of said composition being not greater than about 4.0 mm. and the cold flow of said composition being not greater than 2.5 inches, said plasticity being the height of a cylindrical pellet of the composition weighing 2.0 grams and having an initial diameter of 16 mm. placed on a parallel plate plastometer and maintained at 100° F. under a load of 5000 grams measured at the end of a 14 minute period, and said cold flow being measured by sticking a ball of the adhesive weighing 3.0 grams against a vertical glass plate and measuring the downward flow thereof at room temperature at the end of a 24 hour period.

11. An adhesive composition adapted to stick to unprimed polyvinylchloride resin film to provide an adhesive layer surface which is characterized by tenacious adhesion to other objects including human skin but relatively little adhesion to itself, whereby upon contact of two portions of the adhesive surface they will not adhere to each other to such an extent that upon their separation from each other there is disruption of the adhesive mass and undue deformation of the film backing, said composition comprising an ester of a copolymer of maleic anhydride and a vinyl compound selected from the group consisting of styrene and vinyl toluene copolymerized in approximately equimolecular proportions, the copolymer having an intrinsic viscosity in the approximate range of 0.2 to 2.0 as measured in cyclohexanone at 30° C., at least 70% of the potential carboxyl groups present in the anhydride groups in said copolymer being esterified with an aliphatic primary monohydric saturated alcohol having 6 to 16 carbon atoms, and a highly polymerized polyisobutylene in an amount equal to at least 5% by weight of the composition, the plasticity of said composition being not greater than about 4.0 mm. and the cold flow of said composition being not greater than 2.5 inches, said plasticity being the height of a cylindrical pellet of the composition weighing 2.0 grams and having an initial diameter of 16 mm. placed on a parallel plate plastometer and maintained at 100° F. under a load of 5000 grams measured at the end of a 14 minute period, and said cold flow being measured by sticking a ball of the adhesive weighing 3.0 grams against a vertical glass plate and measuring the downward flow thereof at room temperature at the end of a 24 hour period.

12. A composition of claim 11 wherein the vinyl compound is styrene and the alcohol is n-decanol.

13. A method of preparing the composition of claim 11 which comprises forming a solution of a copolymer of maleic anhydride and a vinyl compound selected from the group consisting of styrene and vinyl toluene copolymerized in approximately equimolecular proportions in a non-aqueous solvent, the copolymer having an intrinsic viscosity in the approximate range of 0.2 to 2.0 as measured in cyclohexanone at 30° C., incorporating in said solution an aliphatic primary monohydric saturated alcohol having 6 to 16 carbon atoms together with an esterification catalyst and an antioxidant, and heating the resulting solution to esterification temperatures with removal of water of esterification from the system until at least 70% of the potential carboxyl groups present in the anhydride groups in said copolymer are esterified, recovering the resulting ester from the solution, and mixing at least 5% of the highly polymerized polyisobutylene therewith, based on the weight of the composition.

14. An adhesive product comprising an adhesive supporting surface coated with an adhesive composition adapted to stick to unprimed polyvinylchloride resin film to provide an adhesive layer surface which is characterized by tenacious adhesion to other objects including human skin but relatively little adhesion to itself, whereby upon contact of two portions of the adhesive surface they will not adhere to each other to such an extent that upon their separation from each other there is disruption of the adhesive mass and undue deformation of the film backing, said composition comprising an ester of a copolymer of maleic anhydride and a vinyl compound selected from the group consisting of styrene and vinyl toluene copolymerized in approximately equimolecular proportions, the copolymer having an intrinsic viscosity in the approximate range of 0.2 to 2.0 as measured in cyclohexanone at 30° C., at least 70% of the potential carboxyl groups present in the anhydride groups in said copolymer being esterified with an aliphatic primary monohydric saturated alcohol having 6 to 16 carbon atoms, and a highly polymerized polyisobutylene in an amount equal to at least 5% by weight of the composition, the plasticity of said composition being not greater than about 4.0 mm. and the cold flow of said composition being not greater than 2.5 inches, said plasticity being the height of a cylindrical pellet of the composition weighing 2.0 grams and having an initial diameter of 16 mm. placed on a parallel plate plastometer and maintained at 100° F. under a load of 5000 grams measured at the end of a 14 minute period, and said cold flow being measured by sticking a ball of the adhesive weighing 3.0 grams against a vertical glass plate and measuring the downward flow thereof at room temperature at the end of a 24 hour period.

15. An adhesive composition adapted to stick to unprimed polyvinylchloride resin film to provide an adhesive layer surface which is characterized by tenacious adhesion to other objects including human skin but relatively little adhesion to itself, whereby upon contact of two portions of the adhesive surface they will not adhere to each other to such an extent that upon their separation from each other there is disruption of the adhesive mass and undue deformation of the film backing, said composition comprising an ester of a copolymer of maleic anhydride and a vinyl compound selected from the group consisting of styrene and vinyl toluene copolymerized in approximately equimolecular proportions, the copolymer having an intrinsic viscosity in the approximate range of 0.2 to 2.0 as measured in cyclohexanone at 30° C., at least 70% of the potential carboxyl groups present in the anhydride groups in said copolymer being esterified with an aliphatic primary monohydric saturated alcohol having 6 to 16 carbon atoms, and a highly polymerized polyethylacrylate in an amount equal to at least 5% by weight of the composition, the plasticity of said composition being not greater than about 4.0 mm. and the cold flow of said composition being not greater than 2.5 inches, said plasticity being the height of a cylindrical pellet of the composition weighing 2.0 grams and having an initial diameter of 16 mm. placed on a parallel plate plastometer and maintained at 100° F. under a load of 5000 grams measured at the end of a 14 minute period, and said cold flow being measured by sticking a ball of the adhesive weighing 3.0 grams against a vertical glass plate and measuring the downward flow thereof at room temperature at the end of a 24 hour period.

16. A composition of claim 15 wherein the vinyl compound is styrene and the alcohol is n-decanol.

17. A method of preparing the composition of claim 15 which comprises forming a solution of a copolymer of maleic anhydride and a vinyl compound selected from the group consisting of styrene and vinyl toluene copolymerized in approximately equimolecular proportions in a non-aqueous solvent, the copolymer having an intrinsic viscosity in the approximate range of 0.2 to 2.0 as measured in cyclohexanone at 30° C., incorporating in said solution an aliphatic primary monohydric saturated alcohol having 6 to 16 carbon atoms together with an esterification catalyst and an antioxidant, and heating the resulting solution to esterification temperatures with removal of water of esterification from the system until at least 70% of the potential carboxyl groups present in the anhydride groups in said copolymer are esterified, recovering the resulting ester from the solution, and mixing at least 5% of the highly polymerized polyethylacrylate therewith, based on the weight of the composition.

18. An adhesive product comprising an adhesive supporting surface coated with an adhesive composition adapted to stick to unprimed polyvinylchloride resin film to provide an adhesive layer surface which is characterized by tenacious adhesion to other objects including human skin but relatively little adhesion to itself, whereby upon contact of two portions of the adhesive surface they will not adhere to each other to such an extent that upon their separation from each other there is disruption of the adhesive mass and undue deformation of the film backing, said composition comprising an ester of a copolymer of maleic anhydride and a vinyl compound selected from the group consisting of styrene and vinyl toluene copolymerized in approximately equimolecular proportions, the copolymer having an intrinsic viscosity in the approximate range of 0.2 to 2.0 as measured in cyclohexanone at 30° C., at least 70% of the potential carboxyl groups present in the anhydride groups in said copolymer being esterified with an aliphatic primary monohydric saturated alcohol having 6 to 16 carbon atoms, and a highly polymerized polyethylacrylate in an amount equal to at least 5% by weight of the composition, the plasticity of said composition being not greater than about 4.0 mm. and the cold flow of said composition being not greater than 2.5 inches, said plasticity being the height of a cylindrical pellet of the composition weighing 2.0 grams and having an initial diameter of 16 mm. placed on a parallel plate plastometer and maintained at 100° F. under a load of 5000 grams measured at the end of a 14 minute period, and said cold flow being measured by sticking a ball of the adhesive weighing 3.0 grams against a vertical glass plate and measuring the downward flow thereof at room temperature at the end of a 24 hour period.

References Cited in the file of this patent

UNITED STATES PATENTS

| | | |
|---|---|---|
| 2,454,284 | Kirk | Nov. 23, 1948 |
| 2,537,018 | Barrett | Jan. 9, 1951 |
| 2,615,843 | Giammaria | Oct. 28, 1952 |
| 2,647,094 | Hahn | July 23, 1953 |
| 2,676,934 | Butler | Apr. 27, 1954 |
| 2,710,283 | Linsk | June 7, 1955 |

FOREIGN PATENTS

| | | |
|---|---|---|
| 588,725 | Great Britain | June 2, 1947 |

UNITED STATES PATENT OFFICE

CERTIFICATE OF CORRECTION

Patent No. 2,866,771　　　　　　　　　　　　　December 30, 1958

John C. Sellers

It is hereby certified that error appears in the printed specification of the above numbered patent requiring correction and that the said Letters Patent should read as corrected below.

Column 4, line 20, for "satisfactroy" read -- satisfactory --; line 22, strike out "in any case" and insert instead -- having 6 to 16 carbon atoms inclusive --; same line, strike out "Generally, satisfactory adhesives" and insert instead -- These --; column 12, line 9, for "sodlution" read -- solution --.

Signed and sealed this 31st day of March 1959.

(SEAL)
Attest:

KARL H. AXLINE　　　　　　　　　　　　　　　ROBERT C. WATSON
Attesting Officer　　　　　　　　　　　　　　Commissioner of Patents